(12) United States Patent
Ashby

(10) Patent No.: US 9,157,549 B2
(45) Date of Patent: Oct. 13, 2015

(54) SPIGOT ATTACHMENT OPERATED WITH FOOT CONTROL DEVICE

(71) Applicant: Theo D. Ashby, Hillsboro, OR (US)

(72) Inventor: Theo D. Ashby, Hillsboro, OR (US)

( * ) Notice: Subject to any disclaimer, the term of this patent is extended or adjusted under 35 U.S.C. 154(b) by 0 days.

(21) Appl. No.: 13/644,370

(22) Filed: Oct. 4, 2012

(65) Prior Publication Data

US 2013/0087728 A1    Apr. 11, 2013

Related U.S. Application Data

(60) Provisional application No. 61/626,903, filed on Oct. 5, 2011.

(51) Int. Cl.
*F16K 31/62*    (2006.01)

(52) U.S. Cl.
CPC ...................................... *F16K 31/62* (2013.01)

(58) Field of Classification Search
CPC .................................. F16K 31/62; E03C 1/052
USPC ......... 251/213, 295, 294, 291, 293, 264, 273, 251/339; 222/505, 509; 74/512
See application file for complete search history.

(56) References Cited

U.S. PATENT DOCUMENTS

| | | | | |
|---|---|---|---|---|
| 2,830,618 | A * | 4/1958 | Mitchell | 137/599.03 |
| 2,892,612 | A * | 6/1959 | Georgieff | 251/289 |
| 3,233,787 | A * | 2/1966 | Ross | 222/179 |
| 3,536,294 | A | 10/1970 | Rodrigues | |
| 4,052,035 | A | 10/1977 | Kenny et al. | |
| 5,029,806 | A | 7/1991 | Huo-Lien et al. | |
| 5,125,623 | A * | 6/1992 | Kiedinger | 251/295 |
| 5,199,119 | A * | 4/1993 | Weber | 4/619 |
| 5,263,684 | A * | 11/1993 | McGuire | 251/294 |
| 5,297,774 | A | 3/1994 | Chuang | |
| 5,307,837 | A * | 5/1994 | Woltz et al. | 137/607 |
| 6,089,542 | A * | 7/2000 | Caravella et al. | 251/295 |
| 6,126,046 | A * | 10/2000 | Baculy | 222/505 |
| 7,302,713 | B1 * | 12/2007 | Bhatt et al. | 4/249 |
| 7,753,235 | B2 * | 7/2010 | Jahnke et al. | 222/179 |
| 8,307,851 | B2 * | 11/2012 | Warsowe | 137/607 |

* cited by examiner

*Primary Examiner* — John K Fristoe, Jr.
*Assistant Examiner* — Andrew J Rost
(74) *Attorney, Agent, or Firm* — J. Curtis Edmondson; Law Offices of J. Curtis Edmondson

(57) ABSTRACT

A kit and devices for operating a spigot of a portable liquid container with a foot pedal, including a foot control member; a spigot having a valve body, a shaft, and a button member; and a spigot control device coupled to the foot control member with a flexible cable.

6 Claims, 13 Drawing Sheets

SPIGOT ATTACHMENT OPERATED WITH FOOT CONTROL DEVICE

CROSS-REFERENCE TO RELATED APPLICATIONS

This application claims the benefit of provisional patent application Ser. No. 61/626,903 files Oct. 5, 2011 by the present inventor.

FEDERALLY SPONSORED RESEARCH

Not Applicable

SEQUENCE LISTING OR PROGRAM

Not applicable

BACKGROUND

1. Field of Invention Background

The invention relates to spigots of a portable liquid container.

2. Prior Art

References Cited

| U.S. Patent Documents | | |
| --- | --- | --- |
| 4,052,035 | November 1977 | Kenny-Armstrong |
| 3,536,294 | October 1970 | Rodriquez |
| 6,126,046 | October 2000 | Baculy |
| 5,297,774 | September 1979 | Medlock |
| 5,029,806 | July 1991 | Chuang |

This invention relates to spigots of portable liquid containers, specifically providing a means to allow users to operate the spigot hands free by using a remotely controlled foot device. Portable liquid containers are made with a spigot located near the bottom of the container for dispensing the contents of the container. These spigots are constructed either with a button on top, with a shaft and valve moving vertically with respect to the body of the spigot, or they have a button on the side with a shaft and valve that move horizontally with respect to the spigot body. These spigots require at least one hand to press the spigot button to open the valve. Most of the time, both hands are needed to operate these spigots. One hand is needed to press the spigot button, the other hand is needed to hold a cup, receiving container, or other object below the spigot while it is being filled or washed.

These portable containers are often placed in public places and used by many people. Frequently dirty hands touch the spigot leaving the spigot dirty. In addition, these dirty hands on the spigot could create an enormous and dangerous risk for contamination and spreading infectious diseases. When the containers are used beverages, the dirty spigot will be very unappealing. No one wants to touch the spigot or get a drink if a previous user coughed or sneezed into his hand and then used that hand to open the spigot.

Another problem is that these spigots on portable liquid containers can be hard to operate. These spigots are placed near the bottom of the container which makes them hard to see and locate. These spigots also have very stiff springs so the buttons on them are hard to press. They are especially difficult to operate by children and people with weak hands.

The most common way to use the spigot is to hold a cup or other receiving container under the spigot with one hand. The other hand is needed to operate the spigot. Both hands are needed to perform this simple task. With both hands occupied, frequent spills occur.

Portable containers are frequently used where other sources of clean water are not available to wash hands, food and other objects. The spigots on the containers are difficult to use for washing hands or other objects because one hand is needed to operate the spigot so only one hand is available for washing.

The embodiments of the invention in this application have solved all these problems, by providing a means for operating a spigot and dispensing liquid from a portable container using a foot controlling device. With an embodiment of this invention attached to the spigot, users are able to activate the spigot valve by using only their foot. Since the spigot is activated with the foot, both hands are left completely free to hold a receiving container or other items. Using the foot, a person is able to apply greater force than with fingers so children and those with weak hands can easily open and close the spigot. Since hands are free to securely hold other things, there are fewer spills and messes to clean up. Since the foot is used to control the spigot, there is no need for a user to touch the spigot, therefore the spigot is kept clean and free from germs. There is less chance for spreading disease. The container will be more inviting, because users will not be concerned about whether a previous user had touched the spigot and left dirt or disease causing germs. The remote operation of the spigot with the foot also allows the user to put both hands under the spigot while the liquid flows over both hands for a thorough cleaning Foot control of the spigot also allows for thorough cleaning and rinsing of utensils, food or other objects. This can be very important in a remote area where clean running water is not available.

Methods of dispensing liquids using a foot-activated device exist, as shown in prior art such as U.S. Pat. No. 4,052,035 issued Oct. 4, 1997 but these devices are not portable. They are not used to activate the spigot of portable container. They are not easily attached or removed from the spigot of the portable container. Instead, they are meant to be used with a facet that is not portable and is part of permanent fixture. These facet adapters are usually permanently attached to a floor or wall, and become a permanent fixture of a building. Embodiments of this invention are used with a portable container and utilize the spigot already installed on portable containers. The container is moved to the desired location like a table or counter top. Once in place the embodiments are easily and quickly attached to the spigot of the container. The foot control is placed on the floor or ground below the container. Since the embodiments are quickly and easily attached and removed from the spigot of the container, the container can be easily moved, refilled, cleaned or put away.

Other inventors have recognized the difficulty of using the spigot of a portable container with stiff springs. They have sought to improve the spigot by mounting a large handle to the spigot such as in invention U.S. Pat. No. 6,126,046 issued Oct. 3, 2000. While this device may make the spigot easier to open and close, the foot is able to apply much greater force. Using the foot to open the spigot with stiff springs is an enormous improvement over the handle method that was used in prior inventions. Also with these inventions, hands are still required to operate the spigot. The lever on these inventions can be moved to a position where liquid runs from the container continuously, but hands are still required to begin and end the flow of liquid. Those inventions do not operate totally hands free nor do they operate remotely with the use of a foot controlling device. Since hands are still needed to start and end the flow of liquid, all the potential risk for spilling and contaminating the spigot still exist. With hands touching the spigot area there is still a risk of accumulating germs and spreading disease. By using ones foot to operate the spigot, both hands can be used to hold other things while using the spigot. With remote foot operation, spigots and the container contents are kept clean and sanitary because they do not come into contact with dirty hands.

SUMMARY

The embodiments of the invention have a spigot control device that is quickly attached to a spigot of a portable liquid container. With the use of a foot control member, and by means of a flexible cable, the embodiment can remotely open and close a spigot and control the flow of a liquid from a portable container. When the foot control member is pressed, the flexible cable causes the actuator member of the spigot control member to press against and engage the button of the spigot. With the spigot button engaged, the valve spring is compressed, the spigot shaft and valve move to their open positions and liquid is allowed to flow from the spigot. As pressure is released from the foot control member, the spring in the spigot urges the spigot shaft back to the closed position. With the spigot in the closed position, liquid ceases to flow from the container. As the spigot moves to the closed position, the spigot control device, the flexible cable and the foot control device also move to the closed position and are ready for the next use.

Accordingly, the advantages of these embodiments are that they allow the user to remotely open and close the spigot valve easily with the foot, thus keeping hands free and keeping hands from touching the spigot. Children and those with weak hands can more easily operate these spigots which are made with very stiff springs. There is less chance of spilling the liquid since both hands are available. Since there is no touching of the spigot, that area will remain clean, sanitary, and germ free.

The embodiments also make it possible to use the liquid in the container to wash hands, faces, eyes, dishes, food or any other objects using both hands. When the spigot is opened with the foot control member, liquid can flow over both hands at the same time allowing for more thorough washing and rinsing. The embodiments are especially valuable in remote areas where there is no running water and washing is difficult. This embodiments of the invention help prevent disease since dirty hands do not touch the spigot while it is being used.

In addition, by placing a portable container with the spigot adaptor outside, there will be less traffic through the house. Those needing to wash hands or get a drink do not need to come into the house. Still further objects and advantages will become apparent from a study of the following description and accompanying drawings.

DRAWINGS

REFERENCE NUMERALS

Numerals 1 through 9 are used in drawings of a foot control member.

| 1 | Foot operated control member |
| 2 | Foot operated control base |
| 3 | Upper member |
| 4 | Hinge |
| 5 | Spring |
| 6 | Cable mounting member |
| 7 | Cable bracket |
| 8 | Cable shell |
| 9 | Cable core |

Numerals 11 through 19 are used in drawings of a foot control member

| 11 | Foot operated control member |
| 12 | Foot operated control base |
| 13 | Upper member |
| 14 | Hinge |
| 15 | Spring |
| 16 | Cable mounting member |
| 17 | Cable bracket |
| 18 | Cable shell |
| 19 | Cable core |

Numerals 20 through 25 are used in drawings of FIGS. 3 through 8. The drawings are of the 1$^{st}$ and 2$^{nd}$ embodiments.

| 20 | Spigot |
| 21 | Spigot flange |
| 22 | Spigot button |
| 23 | Spigot button |
| 24 | Spigot shaft |
| 25 | Spigot valve |

Numerals 8, 9 and 30 through 37 are used in drawings shown in FIGS. 1 through 4 of the 1$^{st}$ embodiment.

| 8 | Cable shell |
| 9 | Cable core |
| 30 | Spigot control member |
| 31 | Attaching member |
| 32 | Attaching slot |
| 33 | Actuator member |
| 34 | Pin |
| 35 | Cable connecting hole |
| 36 | Cove in attaching member |
| 37 | Grove in attaching member |

Figure 6:
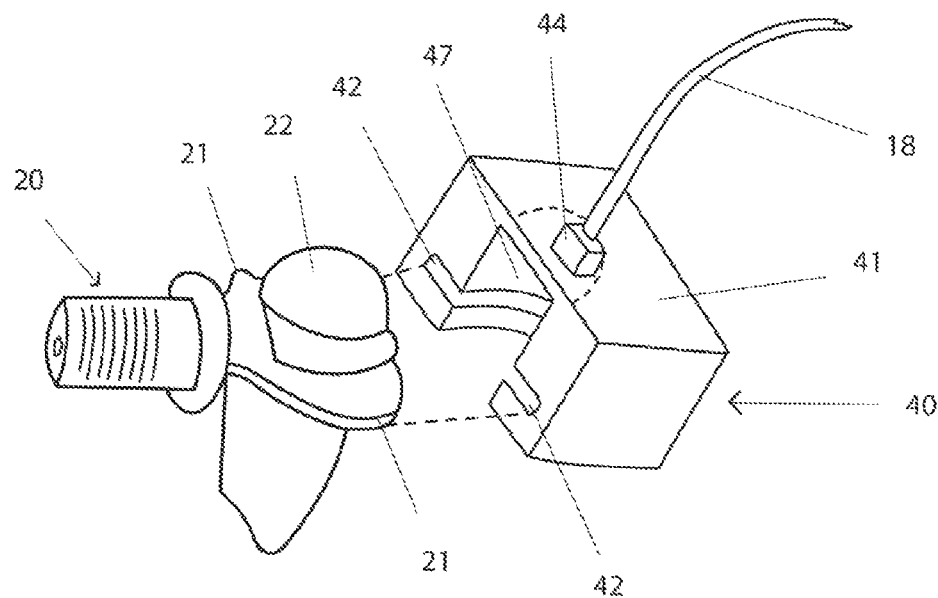
FIG. 6 is a back view drawing of the 2nd embodiment showing how the embodiment is attached to the spigot with a vertically moving shaft with respect to the spigot body.
Figure 7:
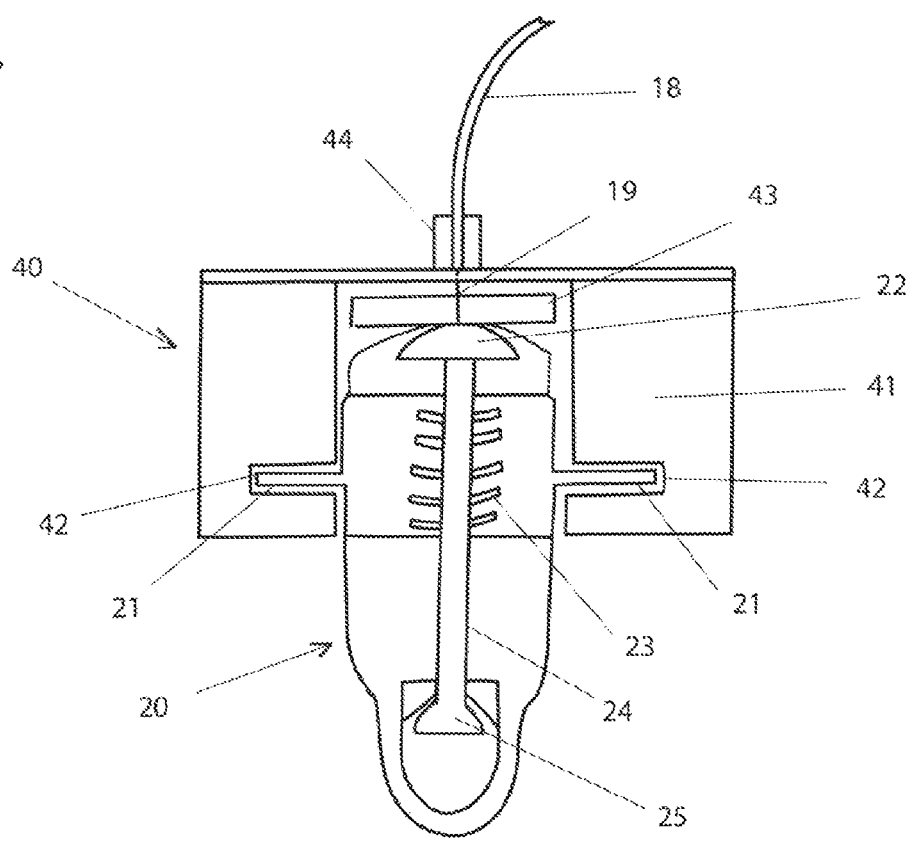
FIG. 7 is a fragmentary front view drawing of the 2nd embodiment attached to a spigot with a vertically moving shaft with respect to the spigot body. The embodiment and spigot are in their closed positions.
Figure 8:
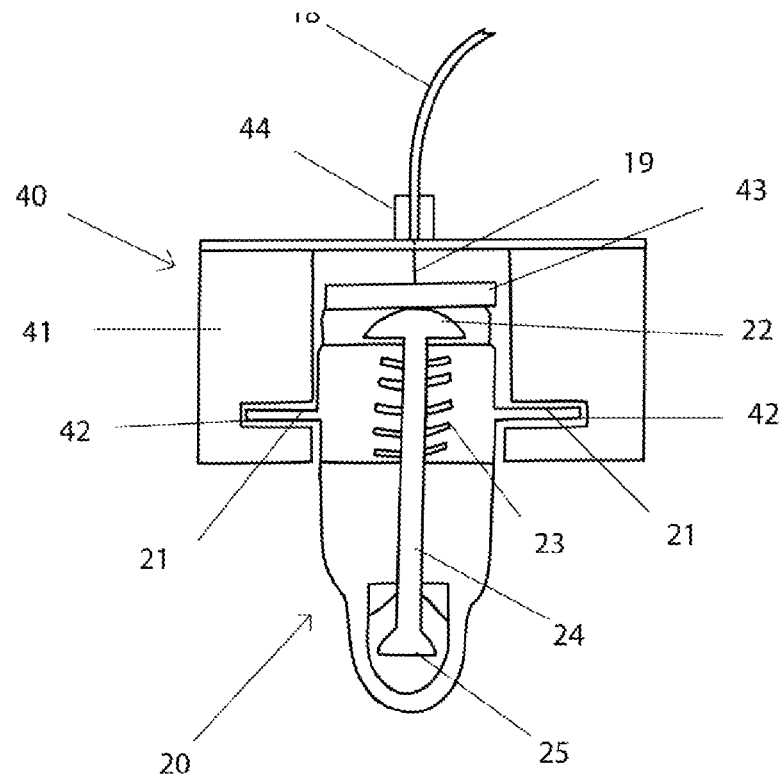
FIG. 8 is a fragmentary front view drawing of the 2nd embodiment attached to a spigot with a vertically moving shaft with respect to the spigot body. The embodiment is engaging the spigot and their members are in their open positions.
Figure 8:
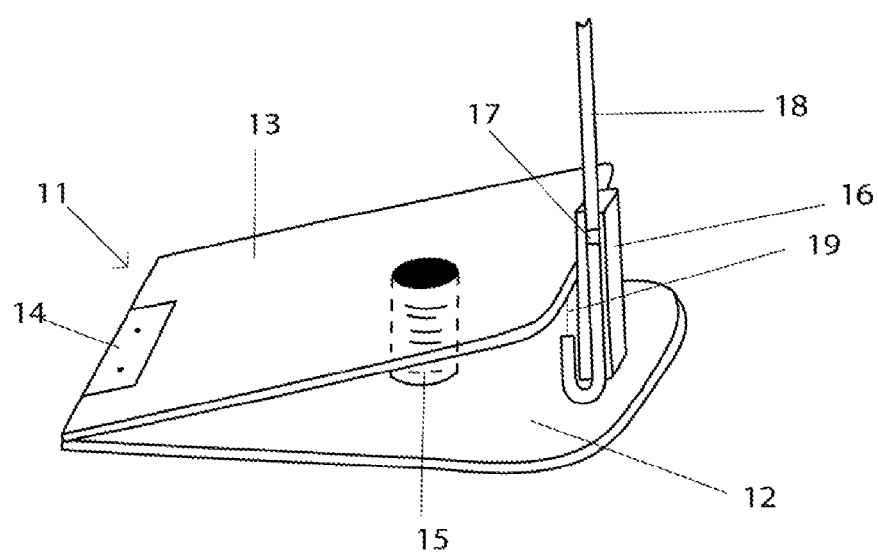
Figure 9:
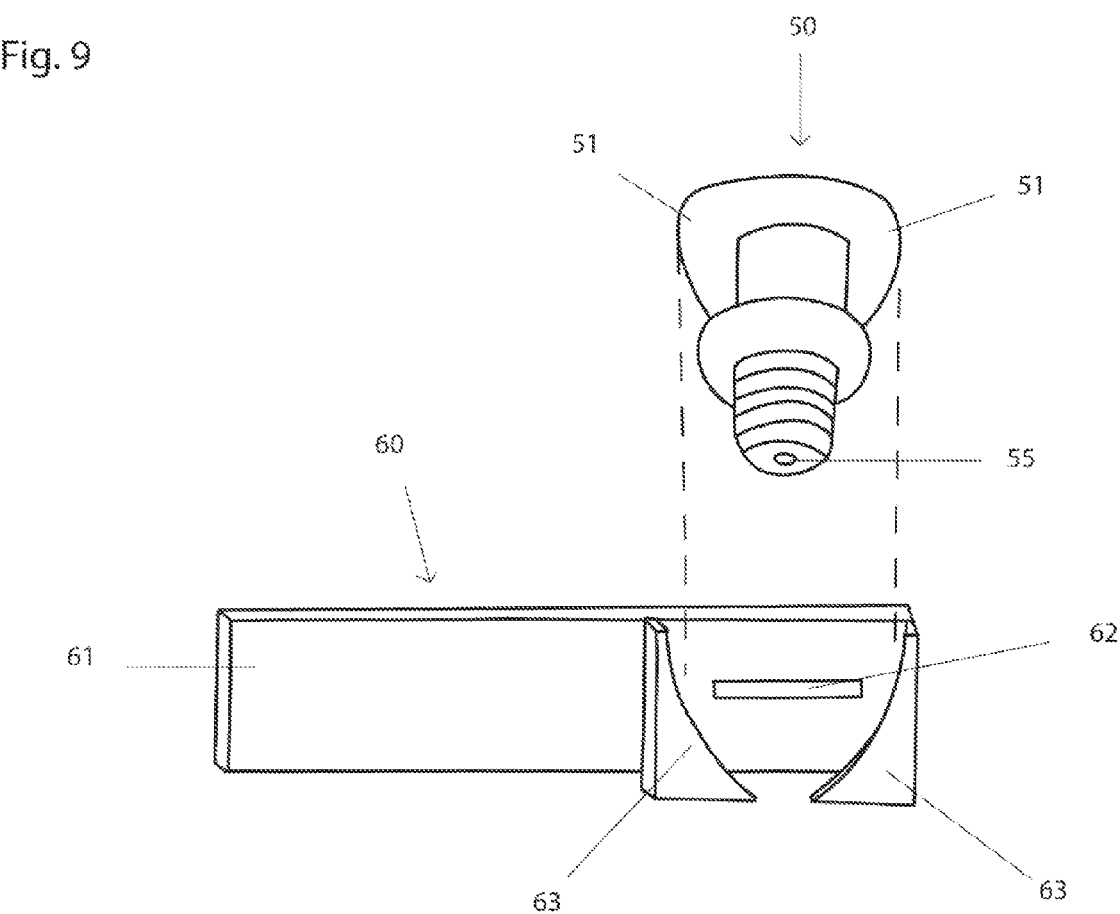
FIG. 9 is a back view drawing of the 3rd embodiment showing how the embodiment is attached to the spigot with a horizontally moving shaft with respect to the spigot body.
Figure 10:
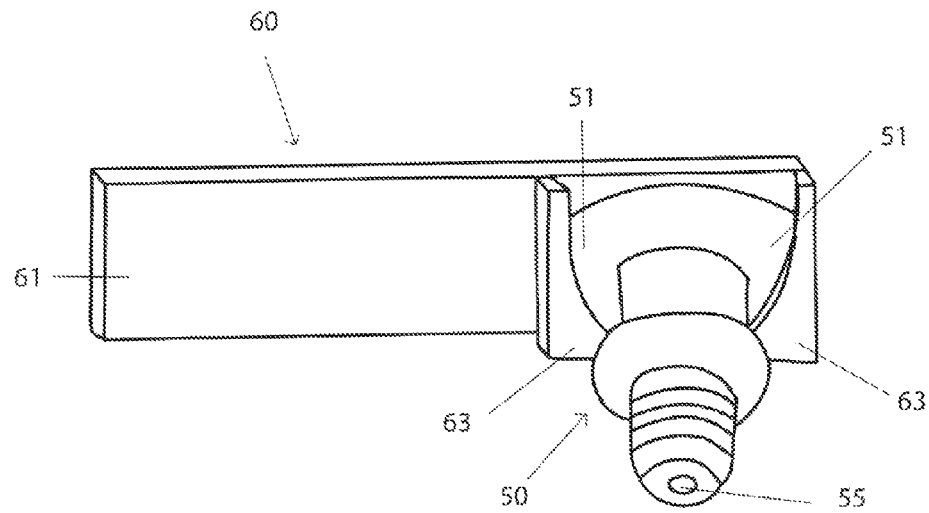
FIG. 10 is a back view drawing of the 3$^{rd}$ embodiment attached to a spigot with a horizontally moving shaft with respect to the spigot body.
Figure 11:
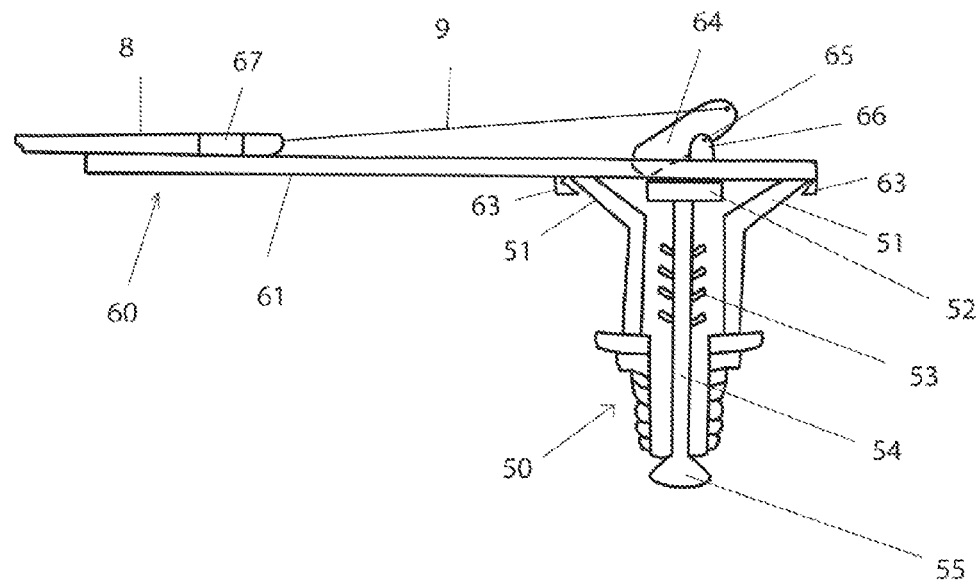
FIG. 11 is a fragmentary top view drawing of the 3rd embodiment attached to a spigot with a horizontally moving shaft with respect to the spigot body. The embodiment and spigot are in their closed positions.
Figure 12:
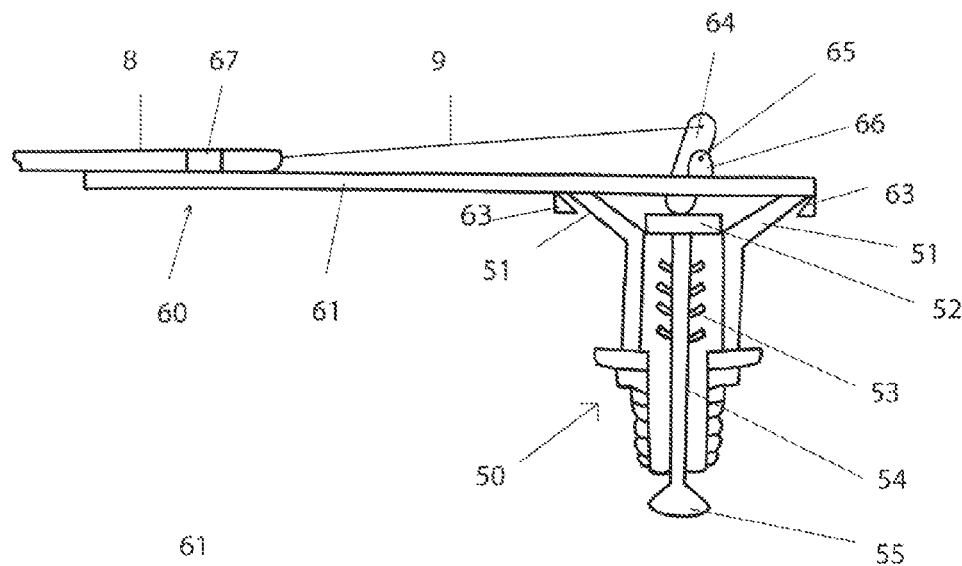
FIG. 12 is a fragmentary front view drawing of the 3rd embodiment attached to a spigot with a horizontally moving shaft with respect to the spigot body. The embodiment is engaging the spigot and they are in their open positions.
Figure 13:
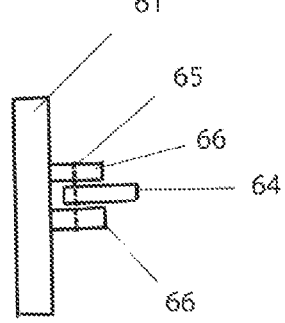
FIG. 13 is an end view drawing of the spigot control member of the 3rd embodiment.
Figure 14:
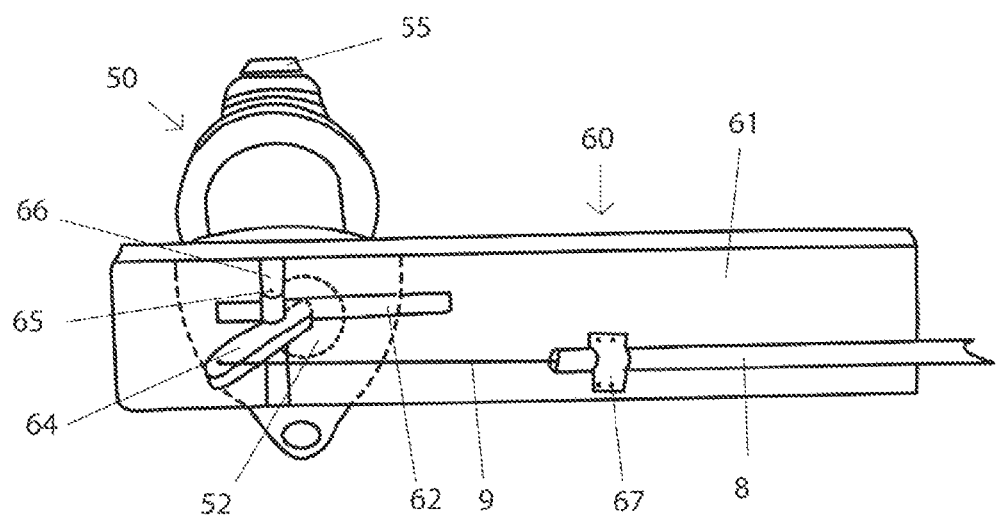
FIG. 14 is a front view drawing of the 3rd embodiment attached to a spigot with a horizontally moving shaft with respect to the spigot body. The embodiment and spigot are in their closed positions.
Figure 15:
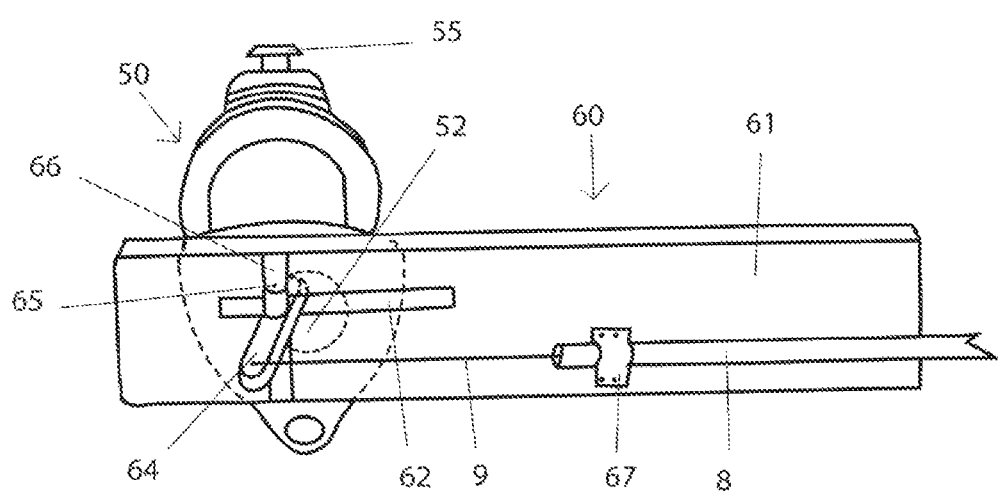
FIG. 15 is a front view drawing of the 3rd embodiment attached to a spigot with a horizontally moving shaft with respect to the spigot body. The embodiment is engaging the spigot button with the members of the spigot in their open positions.
Figure 16:
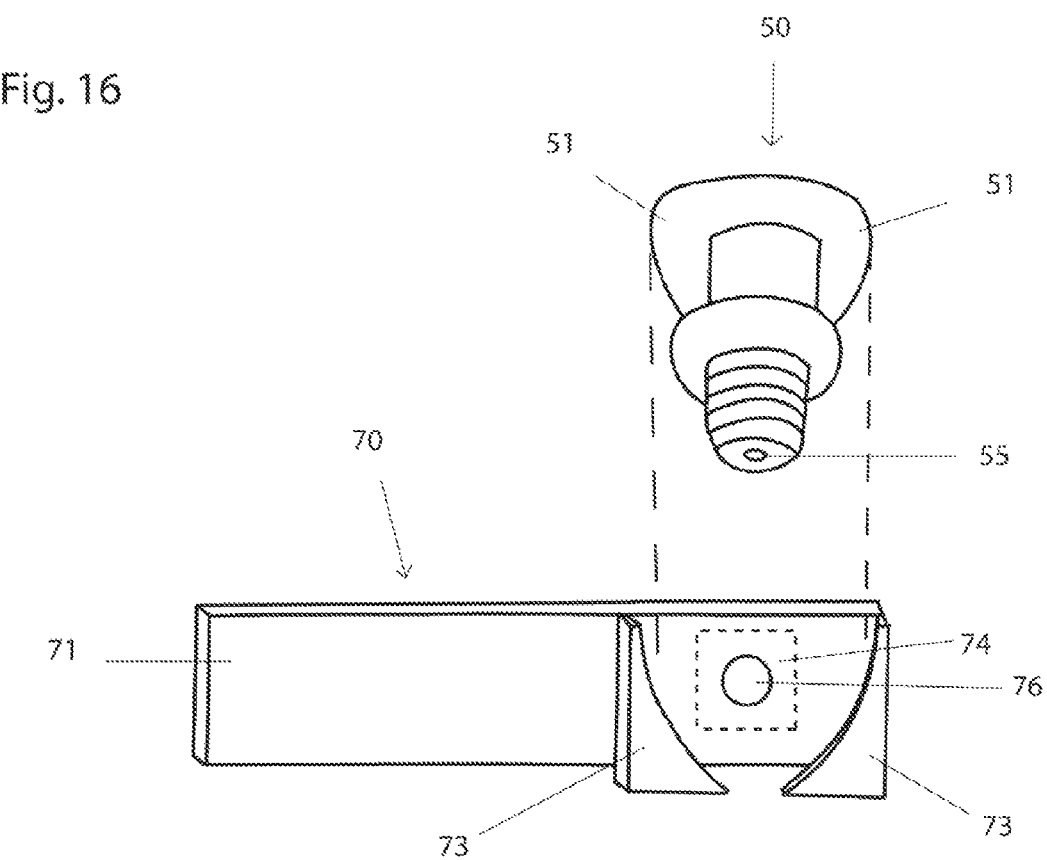
FIG. 16 is a back view drawing of the 4th embodiment showing how the embodiment is attached to the spigot which has a horizontally moving shaft with respect to the spigot body.
Figure 17:
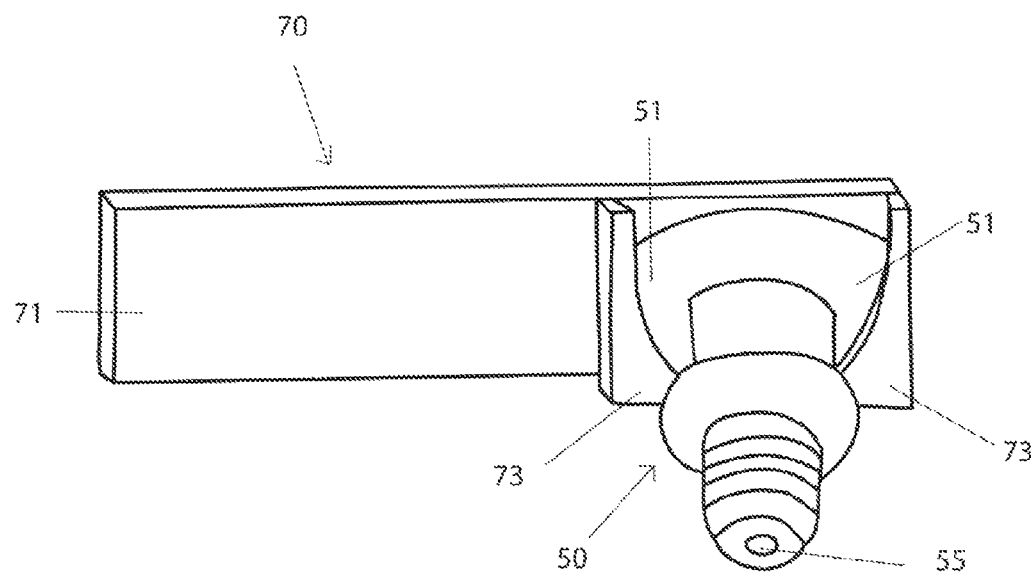
FIG. 17 is a back view drawing of the 4$^{th}$ embodiment showing the embodiment attached to a spigot which has a horizontally moving shaft with respect to the spigot body.
Figure 18:
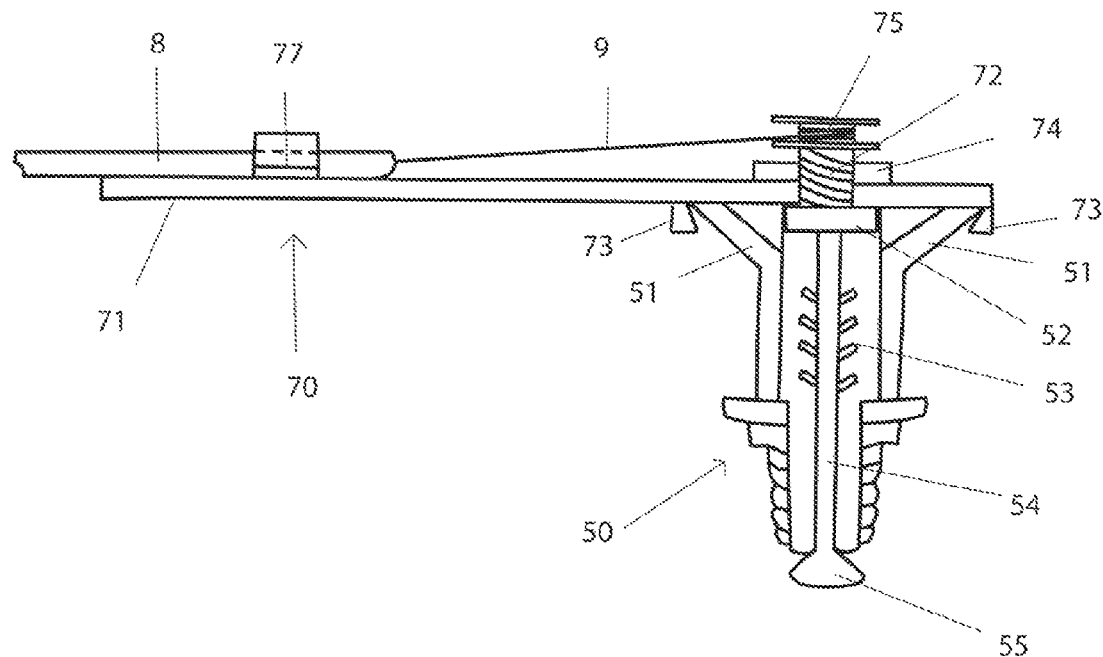
FIG. 18 is a fragmentary top view drawing of the 4th embodiment attached to a spigot with a horizontally moving shaft with respect to the spigot body. The embodiment and spigot are in their closed positions.
Figure 19:
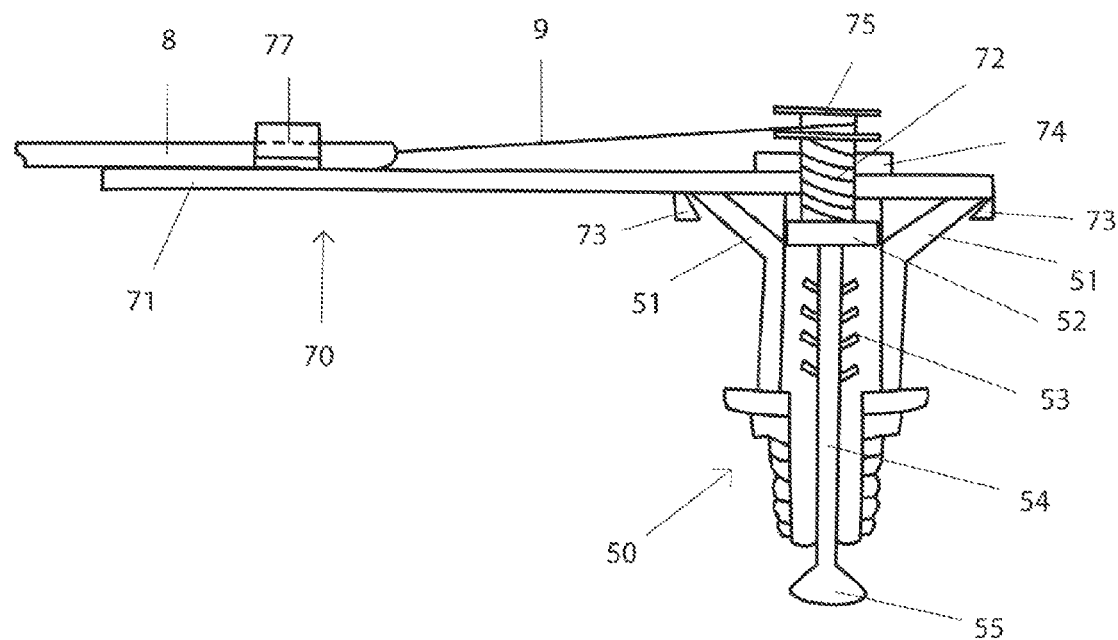
FIG. 19 is a fragmentary top view drawing of the 4th embodiment attached to the spigot with a horizontally moving shaft with respect to the spigot body. The drawing shows the embodiment engaging the spigot button with members in their open positions.
Figure 20:
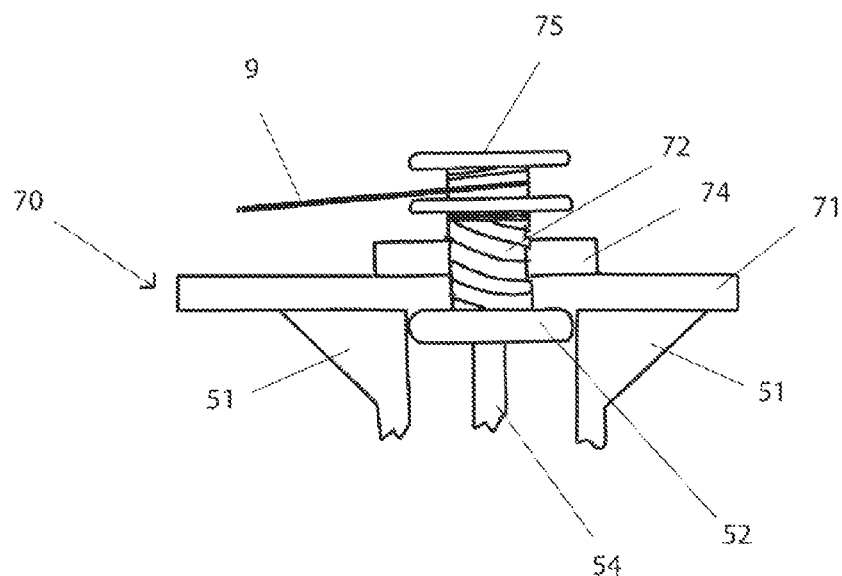
FIG. 20 is a close up fragmentary view drawing of the actuator member of the 4$^{th}$ embodiment attached to a spigot with a horizontally moving shaft with respect to the spigot body. The embodiment members and spigot button are in their closed positions.
Figure 21:
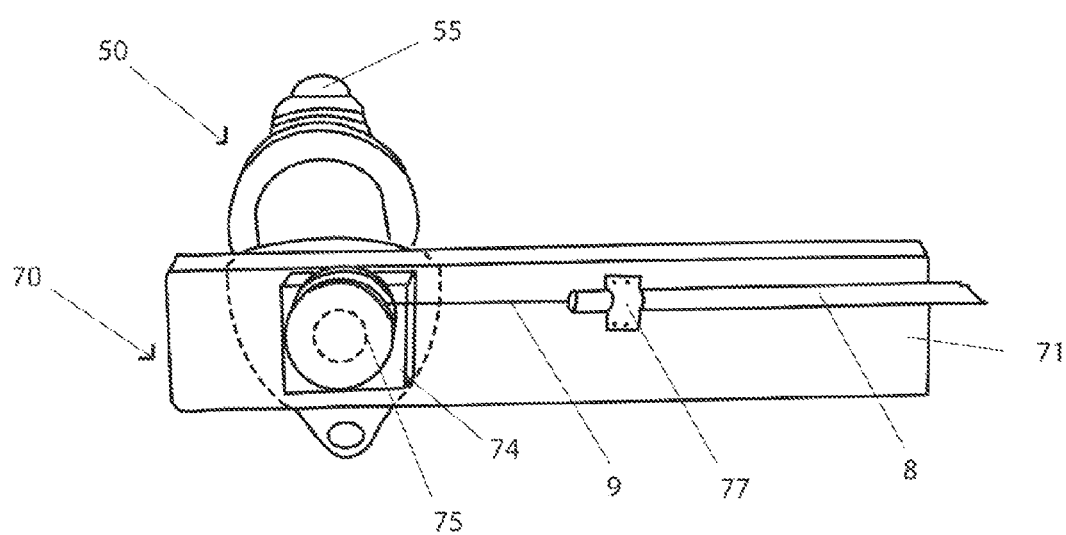
FIG. 21 is a front view of the 4th embodiment attached to a spigot with a horizontally moving shaft with respect to the spigot body. The spigot valve is in the closed position.
Figure 22:
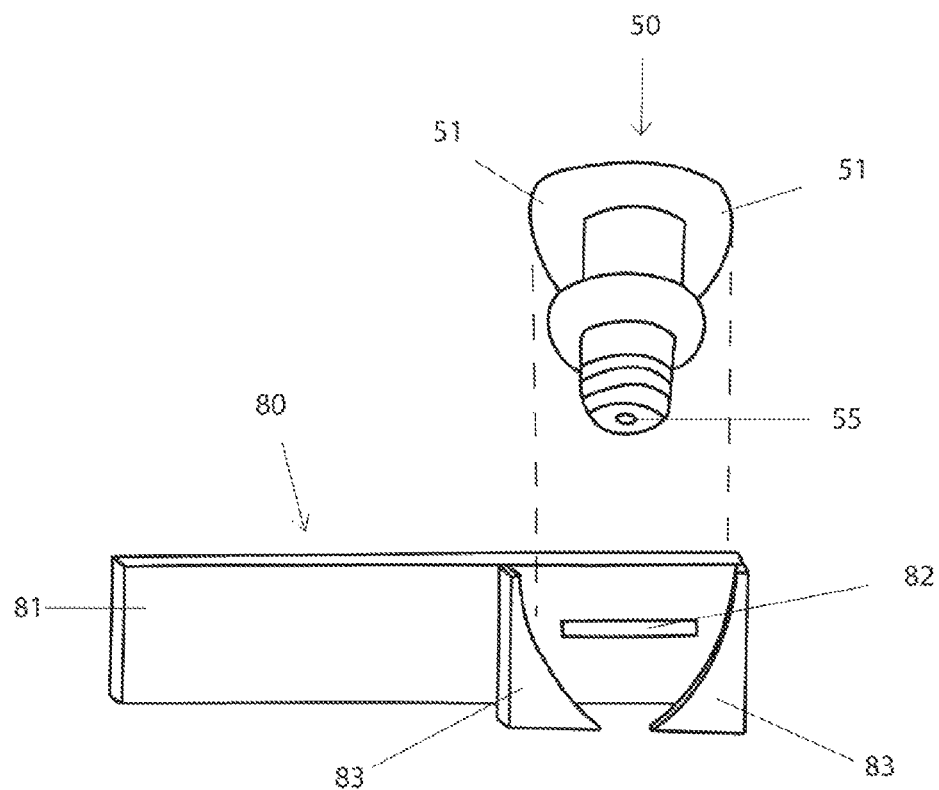
FIG. 22 is a back view drawing of the 5th embodiment showing how the embodiment is attached to the spigot with a horizontally moving shaft with respect to the spigot body.
Figure 23:
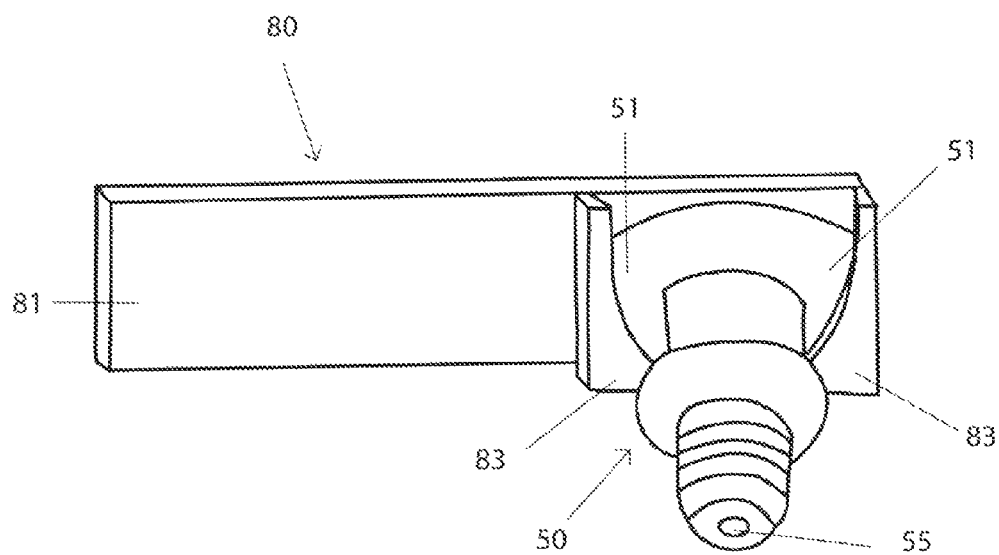
FIG. 23 is a back view drawing of the 5th embodiment showing the embodiment attached to a spigot with a horizontally moving shaft with respect to the spigot body.
Figure 24:
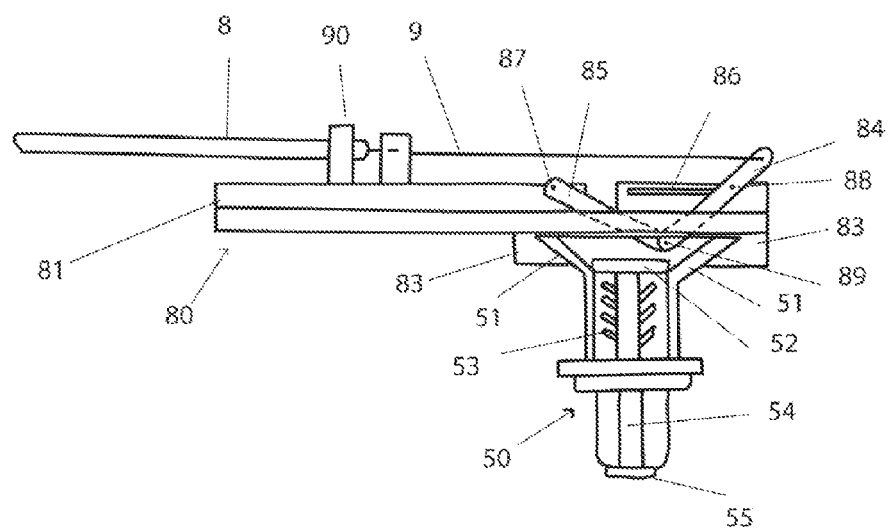
FIG. 24 is a fragmentary top view drawing of the 5th embodiment attached to a spigot with a horizontally moving shaft with respect to the spigot body. The embodiment and spigot are in their closed positions.
Figure 25:
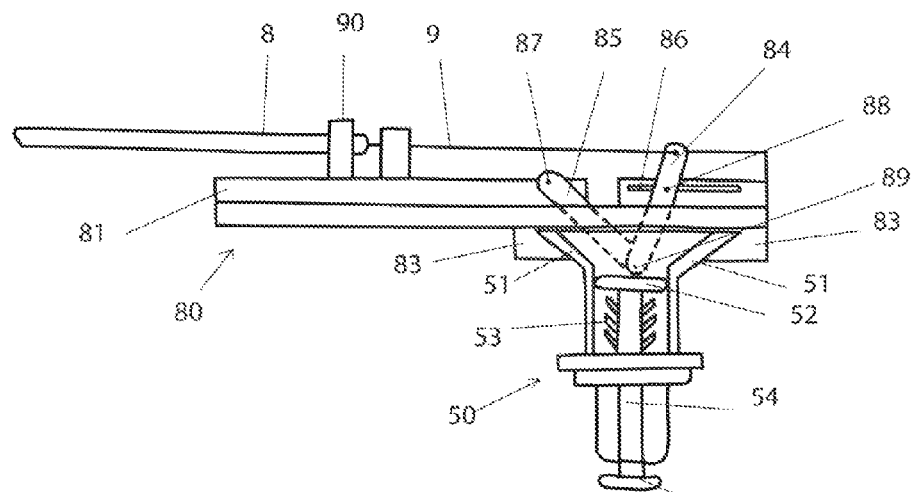
FIG. 25 is a fragmentary top view of the 5th embodiment attached to the spigot with a horizontally moving shaft with respect to the spigot body. The drawing shows the embodiment engaging the spigot button with the members of the spigot in their open positions.
Figure 26:
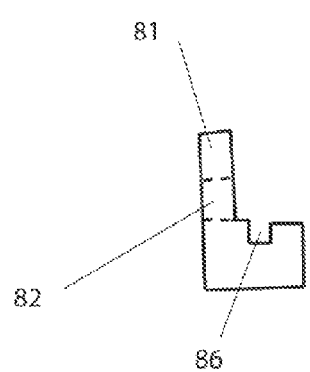
FIG. 26 is an end view drawing of the control member of the 5th embodiment.

Numerals 18, 19 and 40 through 44 are used in drawings shown in FIGS. 6 through 8 of the 2$^{st}$ embodiment.

| 18 | Cable shell |
| 19 | Cable core |
| 40 | Spigot control member |
| 41 | Attaching member |
| 42 | Attaching slot |
| 43 | Actuator member |
| 44 | Cable connecting bracket |

Numerals 50 through 55 are used in drawings of FIGS. 9 through 26.

| 50 | Spigot |
| 51 | Spigot flange |
| 52 | Spigot button |
| 53 | Spigot spring |
| 54 | Spigot shaft |
| 55 | Spigot valve |

Numerals 8, 9 and 60 through 67 are used with FIGS. 9 through 15 showing the 3$^{nd}$ embodiment.

| 08 | Cable Shell |
| 09 | Cable core |
| 60 | Spigot control member |
| 61 | Attaching member |
| 62 | Opening for actuator member |
| 63 | Attaching brackets |
| 64 | Actuator member |
| 65 | Pin |
| 66 | Actuator holding member |
| 67 | Cable mounting strap |

Numerals 8,9 and 70 through 77 are used with drawings shown in FIGS. 16 through 21 of the 4$^{rd}$ embodiment.

| 08 | Cable shell |
| 09 | Cable core |
| 70 | Spigot control member |
| 71 | Attaching member |
| 72 | Actuator threaded member |
| 73 | Attaching bracket |
| 74 | Fixed threaded member |
| 76 | Actuator opening |
| 76 | Actuator opening |
| 77 | Cable mounting strap |

Numerals 8, 9 and 80 through 90 are used with drawings shown in FIGS. 22 through 26 of the 5th embodiment.

| 8 | Cable shell |
| 9 | Cable core |
| 80 | Spigot control device |
| 81 | Attaching member |
| 82 | Opening or actuator member |
| 83 | Attaching bracket |
| 84 | Actuator A |

| | |
|---|---|
| 85 | Actuator B |
| 86 | Activator slot |
| 87 | Pivot Pin |
| 88 | Sliding pin |
| 89 | Hinge pin |

DETAILED DESCRIPTIONS AND OPERATION

Figure 1:
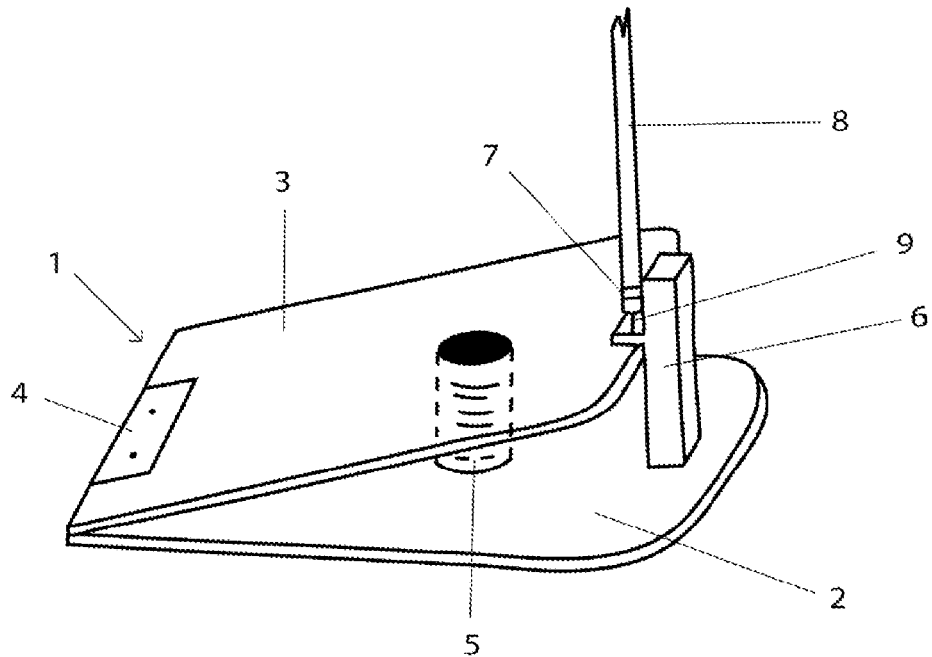
FIG. 1 is a top view drawing of a foot control member that engages other members of the embodiment of the invention by pulling on a flexible cable.

FIG. 1. is a drawing of a foot control member. Any foot controlling device can be used if it produces the correct motion and activates the other members of the embodiments. This drawing shows the foot control member base 2 connected to the upper member 3 of the foot control member 1 with a hinge 4. The cable shell 8 is attached to the cable mounting member 6 with the cable bracket 7. The cable core 9 extends from the cable shell 8 and is attached to the upper member 3 of the foot control member 1. A spring 5 is attached to the upper member 3 and the foot control base member 2.

The foot control member 1 is operated by the user pressing downward on the upper member 3. This movement pulls the cable core 9 from the cable shell 8. As the cable core 9 moves, it engages the actuator member of spigot control member that is attached to the spigot. The foot control member shown in FIG. 1 is used with the $1^{st}$, $3^{rd}$, $4^{th}$ and $5^{th}$ embodiments.

Figure 2:
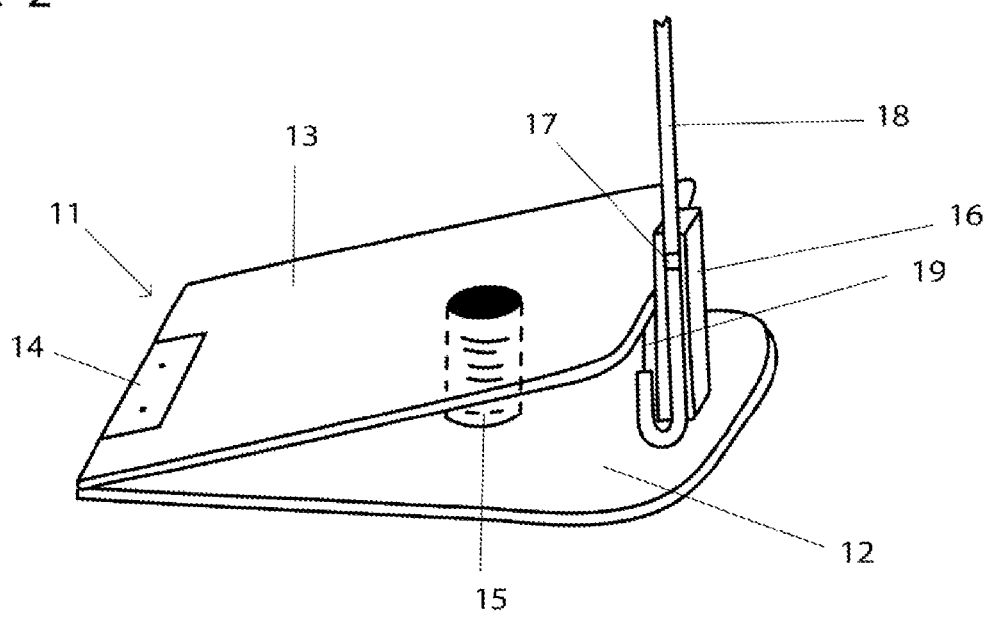
FIG. 2 is a top view drawing of a foot control member that engages other members of the embodiment of the invention by pushing on a flexible cable.

FIG. 2. is a drawing of a foot control member. Any device can be used if it produces the correct motion and activates the members of the embodiments. This drawing shows the foot control member base 12 connected to the upper member 13 of the foot control member 11 with a hinge 14. The cable shell 18 is attached to the cable mounting member 16 with the cable bracket 17 after looping it around so the cable core 19 attaches to the bottom of the upper member 13 of the foot control member 11. A spring 15 is attached to the upper member 13 and the foot control base member 12.

The foot control member 2 is operated by the user pressing downward on the upper member 13. This movement pushes the cable core 19 through the cable shell 18. As the cable core 18 moves, it engages the actuator member of the spigot control member that is attached to the spigot. The foot control member shown in FIG. 2 is used with the $2^{nd}$ embodiment.

Figure 3:
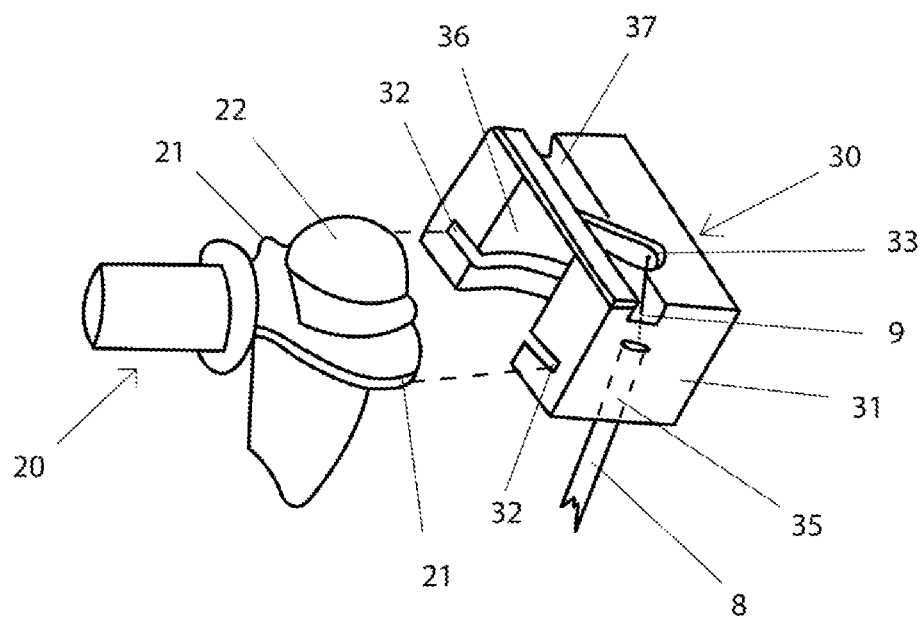
FIG. 3 is a back view drawing of the 1$^{st}$ embodiment showing how the embodiment is attached to a spigot with a vertically moving shaft with respect to the spigot body.

FIG. 3, 4, 5, Embodiment #1

Figure 4:
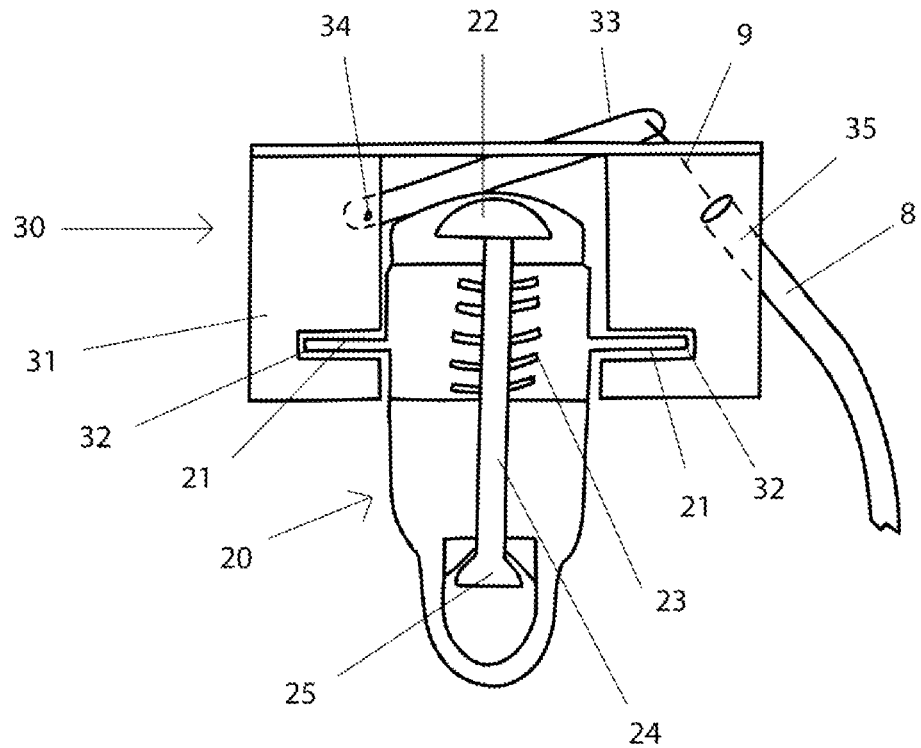
FIG. 4 is a fragmentary front view drawing of the 1$^{st}$ embodiment attached to a spigot with a vertically moving shaft with respect to the spigot body. The embodiment and the spigot are in their closed positions.
Figure 5:
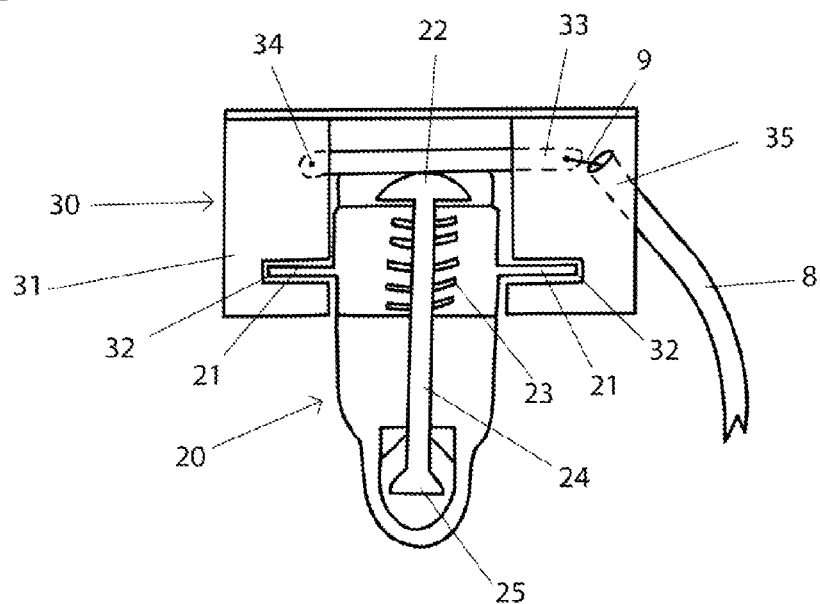
FIG. 5 is a fragmentary front view drawing of the 1$^{st}$ embodiment attached to a spigot with a vertically moving shaft with respect to the spigot body. The embodiment is engaging the spigot button and the members of the spigot are in their open positions.
Figure 5:
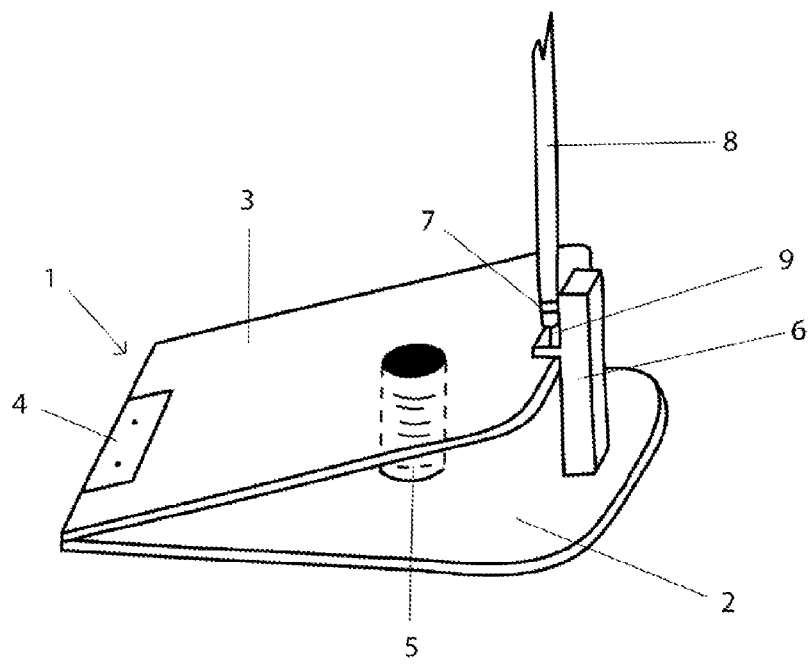

FIGS. 3, 4, and 5 are drawings of the $1^{st}$ embodiment. It consists of a control member 30 that has been formed with a deep cove 36. This cove 36 in the control member 30 is sufficient to allow the front of the spigot 20 and the spigot button 22 to be positioned under the actuator member 33 when the control member 30 is attached to the spigot. A groove 37 formed on top the control member 30 whose depth and width are sufficient to allow the actuator member 33 to pivot inside. The actuator member 33 is connected to the control member 30 at one end with a pin 34. This pin 34 allows the actuator member 33 to pivot downward and engage the spigot button 22 when the control member 30 is attached to the spigot 20. A cable shell connecting hole 35 is formed in the control member 30 wherein one end of the cable shell 8 is inserted and secured in place. The other end of the cable shell 8 is connected to the foot control member 1. The cable core 9 extends from the cable shell 8 and is connected at one end to the actuator member 33. The other end of the cable core 9 is connected to the foot control member.

To operate the embodiment #1, the control device 30 is attached to the spigot 20 which has a vertically moving shaft with respect to the spigot body. This is done by aligning the spigot flanges 21 with the attaching slots 32 in the attaching member 31. The control member 30 is then pressed into place with the spigot flanges 21 inside the attaching slots 32 of the attaching member 31. As the spigot flanges 21 are inserted into the attaching slots 32, the spigot button 22 also moves into position under the actuator member 33. The embodiment and spigot 20 are now in position. When the cable core 9 is activated by a foot control member 1 or other means, the cable core 9 pulls the actuator member 33. The actuator member 33 pivots and engages the spigot button 22. This movement compresses the spigot spring 23, and urges the spigot button 22, the spigot shaft 24 and the spigot valve 25 toward their open positions. With the spigot valve 25 open, liquid is allowed to flow from the portable container.

When the cable core 9 is no longer being activated by the foot control member 1, or other means, the spigot spring 23 decompresses and urges the spigot shaft 24 and the spigot valve 25 back to their closed positions. With the spigot valve 25 now closed, liquid stops flowing from the container and members of the spigot control member 30 and the foot control member 1 move back to their closed positions.

FIG. 6, 7, 8 Embodiment #2

FIGS. 6, 7, and 8 are drawings of the 2nd embodiment. It consists of a control member 40 that has been formed with a deep cove 47. This cove 47 in the control member 40 is sufficient to allow the front of the spigot 20 and the spigot button 22 to be positioned under the actuator member 43 when the control member 40 is attached to the spigot. A hole is formed on top of the control member 40 that is sufficient to allow the cable core 19, to extend from the cable shell 18 and connect with the actuator member 43. On top of the control member 40, is formed a cable shell connecting bracket 44. The cable shell 18 is inserted in the bracket 44 and secured to the top of the control member 40 at one end. The other end of the cable shell 18 is connected to the foot control member 2. The cable core 19 extends through the cable shell 18 and is connected to the actuator member 43 at one end. The other end of the cable core 19 is connected to the foot control member 2.

To operate the embodiment #2, the control device 40 is attached to the spigot 20 which has a vertically moving shaft with respect to the spigot body. This is done by aligning the spigot flanges 21 with the attaching slots 42 in the attaching member 41. The control member 40 is then pressed into place with the spigot flanges 21 inside the attaching slots 42 of the attaching member 41. As the spigot flanges 21 are inserted into the attaching slots 42, the spigot button 22 also moves into position under the actuator member 43. The embodiment #2 is now attached to the spigot 20. When the cable core 19 is activated by a foot control member 2 or by other means, the cable core 19 engages the actuator member 43. The actuator member 43 presses against the spigot button 22. This movement compresses the spigot spring 23, and urges the spigot button 22, the spigot shaft 24 and the spigot valve 25 toward their open positions. With the spigot valve 25 open, liquid is allowed to flow from the container.

When the cable core 19 is no longer being activated by the foot control member 2, or other means, pressure is released on the spigot button 22, the spigot spring 23 decompresses and urges the spigot shaft 24 and the spigot valve 25 to move back to their closed positions. With the spigot valve 25 closed, liquid stops flowing from the container and members of the spigot control member 40 and the foot control member 2 return to their closed positions.

FIGS. 9, 10, 11, 12, and 13 Embodiment #3

FIGS. 9, 10, 11, 12, and 13 are drawings of the 3rd embodiment. This embodiment is designed to be attached to any spigot with a horizontal style moving shaft with respect to the spigot body. While the drawings and description show the embodiment mounted to a spigot with a movable button and fixed flanges, the embodiment can also be mounted to and operated with a spigot with a fixed button area and movable flanges.

The embodiment consists of a control member 60 that is approximately the same height as the spigot 50. It is of sufficient length to hold the cable shell 8 and to allow movement of the actuator member 64. An opening for the actuator member 62 is formed in the control member 60 to allow the actuator member 64 to engage the spigot button 52. Attaching brackets 63 on the back of the control device 60 are formed to hold the spigot 50 in place. On the front of the control device 60 is the actuator holding member 66. A hole is formed in the actuator member 64 where it is connected to the actuator holding member 66 with the pin 65. One end of the actuator member 64 extends through the opening for the actuator member 62. The other end of the actuator member 64 is connected to the cable core 9 which extends from the cable shell 8. The other end of cable core 8 is connected to the foot control member 1. The pin 65 allows the actuator member 64 to pivot and engage the spigot button 52. The cable shell 8 is connected at one end of to the elongated part of the attaching member 61 with the cable mounting strap 67. The other end of the cable shell 8 is the foot control member 1.

To operate the 3rd embodiment, the control member 60 is attached to the spigot 50 by aligning the spigot flanges 51 with the slot between the attaching member 61 and the attaching brackets 63. The control member 60 slides into place with flanges 51 of the spigot 50 between the attaching member 61 and the attaching brackets 63. The control member 60 is positioned so that the opening 62 for the actuator member 64 is aligned with the spigot button 52.

Once in place, the cable core 9 is activated by a foot control member 1 or other means. The movement of the cable core 9 causes the actuator member 64 to pivot around the pin 65. This rotation causes the end of the actuator member 64 to engage the spigot button 52. This pressure on the spigot button 52 urges the spigot shaft 54, the spigot spring 53 and the spigot valve 55 to their open positions. With the spigot valve 55 open, liquid is allowed to flow from the container.

When the cable core 9 is no longer being activated, the spigot spring 53 decompresses and urges the spigot shaft 54, the spigot button 52, and the spigot valve 55 to return to their closed positions. With the spigot valve 55 closed, liquid stops flowing from the container. The decompression of the spigot spring 53 causes the actuator member 64 and the foot control member 1 to move back to their ready positions. The embodiment is now ready for the next use.

FIGS. 16, 17, 18, 19, 20, and 21 Embodiment #4

FIGS. 16, 17, 18, 19, 20 and 21 are drawings of the 4th embodiment. This embodiment is designed to be attached to any spigot with a horizontal style moving shaft with respect to the spigot body. While the drawings and description show the embodiment mounted to a spigot with a movable button and fixed flanges, the embodiment can also be mounted to and operated with a spigot with a fixed button area and movable flanges.

The embodiment consists of a control member 70 that is approximately the same height as the spigot 50. It is of sufficient length to hold the cable shell 8 and to allow movement of the actuator member 72. An opening for the actuator member 76 is formed into the control member 70 to allow the actuator member 72 to engage the spigot button 52. Attaching brackets 73 on the back of the control member 70 are formed to hold the spigot 50 in place. On the front of the control member 70 is formed a fixed threaded member 74 in which the treaded end of actuator member 72 will fit and rotate. The actuator member 72 is threaded on one end and formed with a reel portion 75 on the other end. One end of the cable core 9 winds around and attaches to the reel portion 75 of the actuator member 72 in such a way that when the cable core 9 unwinds, the actuator member 72 will rotate in the direction that will engage the spigot button 52. The other end of the cable core 9 runs through the cable shell 8 and is attached to the foot control member 1. The cable shell is attached at one end to the control member 70 with the cable attaching strap 77. It is attached at the other end to the foot control member 1.

To operate the embodiment #4 the attaching member 71 is attached to the Spigot 50 with a horizontally moving shaft with respect to the spigot body. This is done by aligning the spigot flanges 51 with the attaching brackets 73 on the back of the control member 70. The control member 70 slides onto the spigot 50 with the spigot flanges 51 behind the main body of the control member 70 and secured with the attaching brackets 73. The control member 70 is positioned so that the opening for the actuator member 76 is aligned with the spigot button 52.

After the spigot control member 70 is in place, the foot control member 1 is activated. It pulls and unwinds the cable core 9 from the reel portion 75 of the actuator member 72. As the cable core 9 unwinds, it causes the threaded end of the actuator member 72 to rotate inside the fixed threaded member 74. As the actuator threaded member 72 rotates it engages the spigot button 52. This pressure on the spigot button 52 urges the spigot button 52, the spigot spring 53, the spigot shaft 54, and the spigot valve 55 to move to their open positions. With the spigot valve 55 open, liquid is allowed to flow from the container.

When the foot control member 1 is no longer activated, the spigot shaft 54, spigot button 52, and the spigot valve 55 move back to their closed positions and liquid stops flowing from the container. The decompression of the spigot spring 53 causes the cable core 9 to wind back around the reel portion of the threaded member 75 and the other members of the embodiment return to their closed positions.

FIGS. 22, 23, 24, 25, and 26 Embodiment #5

FIGS. 22, 23, 24, 25, and 26 are drawings of the 5th embodiment. This embodiment is designed to be attached to any spigot with a horizontal style moving shaft with respect to the spigot body. While the drawings and description show the embodiment attached to a spigot with a movable button and fixed flanges, the embodiment can also be attached to and operated with a spigot with a fixed button area and movable flanges.

The embodiment consists of a control member 80 that is approximately the same height as the spigot 50. It is of sufficient length to hold the cable shell 8 and to allow movement of the actuator member A 84 and actuator member B 85. An opening 82 is formed in the control member 80 to allow actuator member A 84 and actuator member B 85 joined by hinge pin 89 to engage spigot button 52. Attaching brackets 83 are formed on the back of the control member 80 to hold the spigot 50 in place. The front of the control device 80 is formed in an L shape. The lower part of the control member 80 is wider than the upper part. The lower wider part of the control member 80 is below the opening for the actuator member 82. On the top edge of the lower part of control member 80, the actuator slot 86 is made. Also on the top edge of the lower part of the control member actuator member B 85 is connected with the pivot pin 87. Actuator member A 84 is connected at one end to actuator member B 85 with the hinge pin 89. The other end of actuator member A 84 is connected to cable core 9. Near the center of actuator member A 84 the actuator sliding pin 88 is inserted. The sliding pin 88 guides the actuator member A 84 along the slot 86.

To operate the embodiment #5 the attaching member 81 is attached to the Spigot 50 with a horizontally moving shaft with respect to the spigot body. This is done by aligning the spigot flanges 51 with the attaching brackets 83 on control member 80. The control member 80 slides onto the spigot 50 with the spigot flanges 51 behind the main body of the control member 80 and secured with the attaching brackets 83. The control member 80 is positioned so that the opening for the actuator members 82 is aligned with the spigot button 52.

After the control member 80 is attached, the cable core 9 is activated by a foot control member 1 or other means. The movement of the cable core 9 causes the pin 88 to slide in the actuator slot 86 and actuator member A 84 connected to actuator member B 85 with hinge pin 83 to engage the spigot button 52 through the actuator opening 82 in the spigot control member 80. This pressure on the spigot button 52 causes the spigot spring 53 to compress and urges the spigot shaft 54 and the spigot valve 55 to their open positions. With the spigot valve 55 in the open position, liquid is allowed to flow from the container. When the cable core 9 is no longer being activated, the spigot spring 53 is decompressed and the spigot shaft 54, the spigot button 52, and the spigot valve 55 are urged back to their closed positions. With the spigot valve 55 in the closed position, liquid stops flowing from the container.

Although the descriptions above contain some specificities, these should not be construed as limiting the scope of the embodiments but as merely providing illustrations of some of the presently preferred embodiments. For example the foot controlling member and the attaching members can be made in any shape that will still provide the same functionality. Thus the scope should not be limited by the examples given.

What is claimed is:

1. A foot actuated kit for assembly with a portable liquid container, the portable liquid container configured for dispensing a liquid via a spigot having a valve body with a shaft member that moves linearly with respect to the valve body between a closed position and an open position and a button member that when engaged urges a spring member to compress and the shaft member to move to the open position, and when the button member is decompressed, the spring member urges the shaft member to move to the closed position, the kit comprising:
   a foot control member; and
   a spigot control device including a moveable actuator member coupled to the foot control member with a flexible cable, the spigot control device arranged and configured to be outside the portable liquid container, wherein when assembled, the spigot control device at least partially houses the button member of the spigot of the portable liquid container, wherein a force generated by depressing the foot control member is transferred to the moveable actuator member, the moveable actuator member compresses the button member connected to the valve body causing the shaft member to move from the closed position to the open position, wherein the moveable actuator member is pivotally connected at one end of the spigot control device, the other end connected to the foot control member by way of the flexible cable, and wherein the moveable actuator member is adapted generally at a distal end for pivotal rotation along a common axis from the valve body of the spigot;
the kit further comprising:
   the moveable actuator member is adapted to be connected on one end to the foot control member by way of the flexible cable and at the other end to a first end of a second moveable actuator member, a second end of the second moveable actuator member is pivotally connected to the spigot control device; and
   a sliding pin is inserted in the moveable actuator, the sliding pin adapted to slide in a slot in the spigot control device by depressing the foot control member.

2. The kit of claim 1, wherein the moveable actuator member moves inside a space formed in the spigot control device to engage the button member of the spigot.

3. A device with a foot operated control member for controlling the dispensing of a liquid from a portable liquid container comprising:
   a spigot including a valve body with a shaft member that moves linearly with respect to the valve body between a closed position and an open position and a button member that when engaged urges a spring member to compress and the shaft member to move to the open position, and when the button member is decompressed, the spring member urges the shaft member to move to the closed position;
   and a spigot control device including a moveable actuator member coupled to the foot operated control member with a flexible cable, the spigot control device arranged and configured to be outside the portable liquid container, wherein when assembled, the spigot control device at least partially houses the button member of the spigot, wherein a force generated by depressing the foot operated control member is transferred to the moveable actuator member, the moveable actuator member compresses the button member connected to the valve body causing the shaft member to move from the closed position to the open position, and wherein the moveable actuator member is adapted generally at a distal end for pivotal rotation along a common axis from the valve body of the spigot;
the device further comprising:
   the moveable actuator member is adapted to be connected on one end to the foot operated control member by way of the flexible cable and at the other end to a first end of a second moveable actuator member, a second end of the second moveable actuator member is pivotally connected to the spigot control device; and
   a sliding pin is inserted in the moveable actuator member, the sliding pin adapted to slide in a slot in the spigot control device by depressing the foot operated control member.

4. The device of claim 3, wherein the moveable actuator member is pivotally connected at one end of the spigot control device, the other end connected to the foot operated control member by way of the flexible cable.

5. The device of claim 3, wherein the moveable actuator member moves inside a space formed in the spigot control device to engage the button member of the spigot.

6. A foot pedal for operating a portable liquid container, the container having a spigot with a compressible button member for starting and stopping the flow of liquid therein, the foot pedal comprising:
   a spigot housing arranged and configured to be outside the portable liquid container, the spigot housing characterized by the spigot being adapted to at least partially house the button member;
   a moveable actuator member adapted to move inside a space formed in the spigot housing to engage the button member; and
   a force transfer cable coupled between the spigot housing and the foot pedal, wherein a force generated by depressing the foot pedal is transferred to the moveable actuator member which in turn is transferred to the button member, causing the spigot to move from a closed position to an open position and the force transfer cable is at least partially contained between the spigot housing and the foot pedal;

the moveable actuator member further comprising:

the moveable actuator member is adapted to be connected on one end to the foot pedal by way of the force transfer cable and at the other end to a first end of a second moveable actuator member, a second end of the second moveable actuator member is pivotally connected to the spigot housing; and a sliding pin is inserted in the moveable actuator member, the sliding pin adapted to slide in a slot in the spigot housing by depressing the foot pedal.

* * * * *